L. W. MISENHEIMER.
FRICTIONAL BUSHING COUPLING.
APPLICATION FILED OCT. 27, 1921.
1,422,598. Patented July 11, 1922.
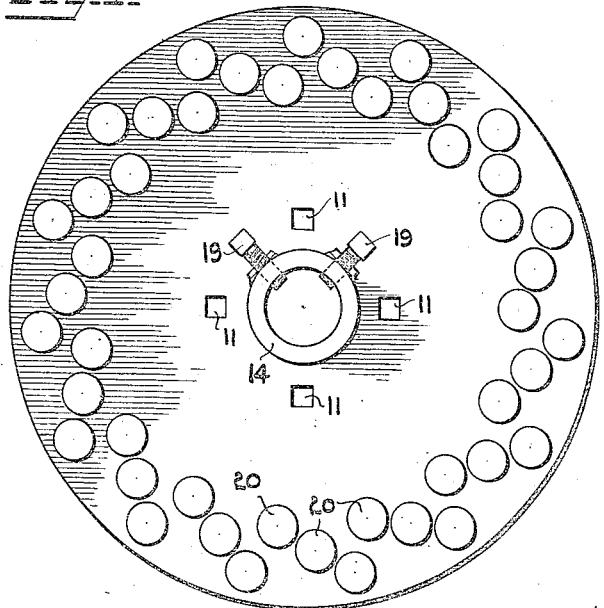
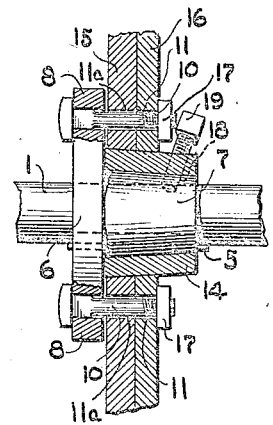
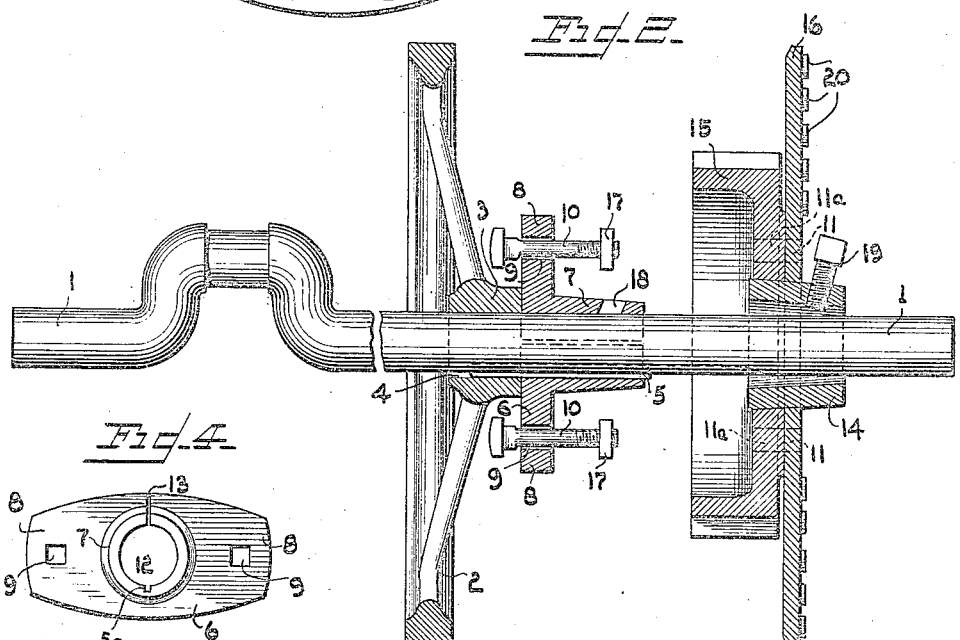
WITNESSES
Charles H. Ourand
Harry E. Seidel
L. W. Misenheimer
INVENTOR
BY
ATTORNEY

UNITED STATES PATENT OFFICE.

LINDSAY WILSON MISENHEIMER, OF GREAT FALLS, SOUTH CAROLINA.

FRICTIONAL BUSHING COUPLING.

1,422,598.  Specification of Letters Patent.  Patented July 11, 1922.

Application filed October 27, 1921. Serial No. 510,692.

*To all whom it may concern:*

Be it known that I, LINDSAY W. MISENHEIMER, a citizen of the United States, residing at Great Falls, in the county of Chester, and State of South Carolina, have invented a new and useful Frictional Bushing Coupling, of which the following is a specification.

This invention relates to bushings, and is more particularly directed to frictional bushings for tight pulleys, head gears, and friction heads for loom drives.

An object of this invention is the provision of an improved, simple and reliable friction bushing, whereby pulleys, gears, friction heads and the like, may be securely tightened upon a shaft by said bushing without necessitating the removal of the shaft, gears or friction head.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a side view of a friction or loom head.

Fig. 2 is a longitudinal section of my improved form of connection between a loom head and a shaft, the parts being separated.

Fig. 3 is a section in detail disclosing the frictional bushing locking a gear and loom head upon a shaft.

Fig. 4 is a side view of the frictional bushing.

The invention comprises a split frictional bushing adapted to abut a brake wheel mounted upon the same shaft upon which the frictional bushing is mounted, a key slidable in cooperative keyways formed in the shaft and the frictional bushing, a gear and a loom head in abutting relation and mounted upon a wedge-shaped sleeve into which is adapted to be forced the wedge-shaped portion of the frictional bushing. Bolts are supplied for drawing the gear and loom head tight upon the frictional bushing and in abutting relation to the hub of the brake wheel.

Referring more particularly to the drawing, 1 indicates a crank shaft, upon which is mounted a balance wheel 2 having a hub 3 provided with a keyway 4, in which is adapted to slide a key 5, which also engages a keyway of the shaft 1, disclosed in dotted lines in Fig. 2.

A split frictional or inside bushing 6 has a conical or wedge-shaped portion 7, and a substantially elliptical-shaped head comprising two outwardly-projecting lateral arms 8, which are perforated, as shown at 9, for the reception of the squared ends of bolts 10. The frictional bushing has a central cylindrical passage 12 adapted to receive the shaft 1. A keyway $5^a$ is cut in the wall of the passage to receive the key 5, which connects the bushing and balance wheel. The bushing is split as shown at 13, in order to permit the bushing to be drawn up tight on the shaft, as the separated portions of the split bushing are forced toward each other, in a manner which will be presently described.

A conical or wedge-shaped outside bushing 14 is adapted to cooperate with the split bushing 6. A gear 15 and friction loom head 16 have alined central perforations, the walls of the perforations being inclined and of such a diameter as to match the outer inclined surface of the conical sleeve or bushing 14, as the gear and loom head are drawn tight upon the said sleeve 14. The closer the gear and head approach the wider end of the sleeve, the greater gripping force is exerted upon the elements. In other words, the central perforations in the head and gear form a conical seat for the conical sleeve or outside bushing 14.

Beyond these central perforations and surrounding the same are a plurality of square openings 11 in the loom or friction head and alining openings $11^a$ in the gear, through which the bolts 10 are adapted to be passed. Nuts 17 on the bolts are drawn tight against the outer face of the loom or friction head, so that the gear and friction head will be drawn tight upon the outer frictional bushing or sleeve 14 and at the same time force the said sleeve 14 upon the conical inner friction bushing 6. The portions upon opposite sides of the split 13 in the bushing 6 will thus be drawn closely together, whereupon the friction bushing 6 will grip the shaft 1 and form a tight fitting for all the parts.

The bushing 6 is provided with a diagonally-disposed opening 18, matching a similar opening in the conical sleeve 14, and through which are passed the set screws 19 for engaging shaft 1, and thus providing an additional means for holding the bushings 6 and 14 upon the shaft 1.

The key 5 engaging the keyway in the frictional bushing 6 and the keyway in the shaft 1, cooperate with the gripping action of the two bushings to prevent slippage of the gear 15 and friction head 16, as well as the balance wheel 2.

The friction or loom head 16 is provided with a series of cork inserts 20 placed upon the outer surface of the loom head, and adapted to frictionally engage a member on the shaft (not shown) for simultaneously rotating said member.

As shown in Fig. 2, the gear 15 and loom head 16, wedged upon sleeve 14, are removed from the frictional bushing 6 until bolts 10 and set screws 19 are out of locking position with their respective openings, the bushing 6 being in abutting relation with the hub 3 of the balance wheel 2.

In assembling, the nuts 17 with bolts 10, and set screws 19, are disengaged, and the unit comprising the gear and loom head wedged upon the outer bushing or sleeve 14, is moved towards the frictional bushing 6 so that the conical portion 7 of the bushing 6 passes through the conical opening of the bushing or sleeve 14. Bolts 10 are inserted through the alined perforations 11 and 11ª, respectively, located in the gear and loom head, and nuts 17 are replaced and drawn up until the bushings are firmly wedged upon each other, with the bushing 6 wedged upon the shaft 1. Set screws 19 are screwed up until their inner ends firmly grip shaft 1. When the bolts 10 are drawn up, they exert a direct pull between the heads 8 of the friction bushing 6 and the back of the loom head 16. The conical walls of the central perforations of the gear and loom head are wedged upon the conical outer wall of the sleeve 14, while the conical inner wall of the sleeve 14 is wedged upon the conical portion 7 of the bushing 6.

While this invention has been described for use in connection with loom drives, it is manifest that the invention has a wider scope of application and may be used for connecting together other elements on the shaft. Therefore, in the claims, I have used the term "element" or "elements" in referring to the parts 15 and 16.

What is claimed is:—

1. In a coupling of the character described, the combination of a shaft, with an inner split bushing keyed to the shaft, an outer bushing, an element mounted upon the outer bushing, said outer bushing with the element thereon being mounted upon the inner bushing, and an adjusting means between the element and the inner bushing for rigidly connecting the parts together and causing the outer bushing to compress the inner bushing and bind it upon the shaft.

2. In a coupling of the character described, the combination of a shaft, an inner bushing keyed thereto and provided with a laterally-projecting head, an element having an opening which is tapered, an outer bushing adapted to be forced into said opening and upon the inner bushing, and means engaging the head of the inner bushing and cooperating with the said element for drawing the element tight upon the outer bushing and the outer bushing tight upon the inner bushing for securing the element upon the shaft.

3. In a coupling of the character described, the combination of a shaft, an inner split conical bushing provided with a laterally-projecting head, an element having a central opening, a conical outer bushing adapted to be forced into said opening and upon the split inner bushing, means engaging the head of the bushing and cooperating with the said element for drawing the element tight upon the conical outer bushing and the outer bushing tight upon the inner bushing, said shaft and inner bushing each being provided with a keyway, and a key inserted in said keyways and cooperating with said means for firmly securing the element to the shaft.

4. In a coupling of the character described, the combination of a shaft, with a split conical inner frictional bushing provided with a laterally projecting head, a conical outer bushing adapted to be seated upon said inner bushing, an element having a central opening to receive the outer bushing, alined perforations in the element and head of the inner bushing, bolts passing through the alined perforations for drawing the element and outer bushing tight upon the inner bushing and likewise the inner bushing tight upon the shaft, keying means for the inner bushing and the shaft, and an auxiliary means engaging the two bushings and the shaft to prevent slippage of the element upon the shaft.

5. In a coupling of the character described, the combination of a shaft, with a split conical inner bushing provided with a laterally-projecting head, a gear and a loom-head having alined central openings of varying diameters, a conical outer bushing adapted to be forced into said openings and onto the split inner bushing, bolts and nuts engaging the head on the inner bushing and cooperating with the outer face of the loom head for drawing the gear and loom head tight upon the outer bushing and the outer bushing tight upon the inner bushing, said shaft and inner bushing being provided with a keyway, a key inserted in said keyway, and set screws passing through the outer bushing and inner bushing and engaging the shaft.

6. In a coupling of the character described, the combination of a shaft, with a balance wheel having a hub provided with a keyway mounted on the shaft, a split inner bushing mounted upon the shaft and also provided with a keyway, a key for connecting the hub of the balance wheel and the inner bushing to the shaft, said inner bushing being provided with an integral head at one end, a gear and a loom head having alined openings each of varying diameters, an outer bushing adapted to be forced into said openings and upon the inner bushing, a screw for connecting the inner bushing and the outer bushing and locking the same upon the shaft, and bolts and nuts connecting the head of the inner bushing to the gear on the loom head for holding the inner bushing within the outer bushing.

In testimony that I claim the foregoing as my own I have hereto affixed my signature.

LINDSAY WILSON MISENHEIMER.